United States Patent [19]

Phillips

[11] 4,238,546

[45] Dec. 9, 1980

[54] LIGHTWEIGHT GYPSUM PRODUCTS AND METHODS OF MAKING SAME

[75] Inventor: Harold L. Phillips, Cochita Lake, N. Mex.

[73] Assignee: Ferjon, Dallas, Tex.

[21] Appl. No.: 61,942

[22] Filed: Jul. 30, 1979

[51] Int. Cl.³ .................. B32B 13/08; B32B 5/18; C04B 31/02
[52] U.S. Cl. ..................... 428/306; 106/86; 106/109; 106/DIG. 1; 156/43; 428/314; 428/402; 428/538
[58] Field of Search ........... 428/306, 310, 314, 402, 428/538, 539; 156/39, 43; 106/86-88, 109, DIG. 1

[56] References Cited

U.S. PATENT DOCUMENTS

| 1,655,718 | 1/1928 | Weiss et al. | 428/314 |
| 1,800,024 | 4/1931 | Marczinczek | 106/86 |
| 2,501,699 | 3/1950 | Stecker | 106/86 |
| 2,803,575 | 8/1957 | Riddell et al. | 428/314 |

*Primary Examiner*—William J. Van Balen

[57] ABSTRACT

Disclosed is a method of making lightweight gypsum products wherein expanded substantially monocellular volcanic ash having a loose bulk density of about 0.05 to about 15 pounds per cubic foot is added to calcined gypsum and water to form a slurry. The hydrated gypsum product formed has a bulk density of about 24 to about 45 pounds per cubic foot.

9 Claims, No Drawings

LIGHTWEIGHT GYPSUM PRODUCTS AND METHODS OF MAKING SAME

This invention relates to gypsum products. More particularly, it relates to gypsum wallboard designed to be used with or without the addition of plaster for forming walls, ceilings, etc. as is commonly used in the construction industry, the core of which includes a major proportion of expanded substantially monocellular volcanic ash.

Gypsum wallboard consisting of a core which is essentially gypsum surfaced with a paper bonded to the core is commonly used in the construction industry. Such wallboard is commonly manufactured by placing a slurry or stucco consisting essentially of calcined gypsum and water between parallel sheets of facing paper, allowing the gypsum to hydrate and harden, and thereafter heating the composite board to cure the gypsum and drive excess water from the core. Ordinarily, the stucco contains small amounts of additives such as starch or other adhesives to promote crystal setting and bonding of the paper to the core. Frequently the stucco also includes minor amounts of paper fiber or the like.

In conventional processes for making gypsum wallboard, sufficient water must be added to calcined gypsum to form the slurry so that fully hydrated gypsum ($CaSO_4.2H_2O$) is formed. In order to insure proper and rapid hydration, and to produce a stucco that is sufficiently liquid to form a uniform core by pouring before setting occurs, excess water in an amount approximating 800 pounds per 1000 square feet of wallboard (in the case of one-half inch board) is usually added to the stucco. The excess water must then be removed in the drying process.

Wallboard one-half inch thick made as described above weighs about 2.2 pounds per square foot. In order to reduce the weight of the finished board, it is common practice to add a foaming agent such as common soap to the stucco. The soap acts both as a wetting agent and as an expander forming small air bubbles in the gypsum core. The soap also aids in maintaining the hydrostatic head in the slurry as it is poured onto and metered between the sheets of facing paper. Conventional one-half inch board made with such foaming agents weighs about 1.8 pounds per square foot. Additional foaming of the stucco to produce lighter board causes the gypsum core to become too spongy to act as a satisfactory wallboard. Furthermore, addition of additional soap or other foaming agents generally interferes with proper hydration, crystal growth and setting of the gypsum.

In accordance with the invention a finely divided powder consisting of particulate, hollow, substantially monocellular bodies of expanded volcanic ash is substituted for part of the calcined gypsum. The expanded monocellular volcanic ash, as defined hereinafter, may be substituted in sufficient quantities to reduce the weight of finished wallboard as much as forty percent or more without adversely affected the quality of the board. In fact, the wallboard of the invention exhibits better thermal and acoustic insulating properties than conventional wallboard and is stronger, harder, more resilient and has better nail retention properties than most conventional gypsum board.

The expanded volcanic ash used in accordance with the invention is volcanic ash which, in its naturally-occurring form, is particulate shards of vesicular glassy material comprising alumina, silica and aluminum silicates. The particulate ash used differs from rhyolitic rock only in the manner in which it was naturally formed. Rhyolitic rock is usually found in solid deposits and, while it is vesicular, has a much higher loose bulk density than naturally-occurring particulate volcanic ash. The particulate volcanic ash used in connection with this invention is volcanic material which was deposited in water and thus frothed to produce a deposit of particulate small-grained glassy shards which are highly vesicular. The particulate material ordinarily is in the form of shards which will pass through sieves of 50 mesh size. Therefore the naturally-occurring shards are no more than about 0.01 inch in at least one dimension. The chemical composition of such volcanic ash may vary slightly from different deposits, but the material is generally silica ($SiO_2$), alumina ($Al_2O_3$) and/or aluminum silicates with minor proportions of oxides and halides of magnesium, iron, sodium, potassium, sulfur and/or calcium. Various other trace elements may be found therein and frequently the shards contain interstitial water. The particulate ash used in connection with the invention has a naturally-occurring loose bulk density of about 40 to about 65 pounds per cubic foot as contrasted to the loose bulk density of crushed rhyolitic rock which is generally about 160 pounds per cubic foot.

For use in accordance with the invention, naturally-occurring particulate volcanic ash having a loose bulk density of about 40 to about 65 pounds per cubic foot is flash heated at reduced pressures to form expanded substantially monocellular hollow spherical bodies which have an internal gas pressure less than atmospheric. The loose bulk volume of the shards is thus expanded about five to fifteen times the original volume and the loose bulk density of the expanded bulk material, because of the spherical shape of the hollow bodies, is reduced to about less than 0.5 to about 15.0 pounds per cubic foot. The expanded material (hereinafter referred to as "expanded monocellular volcanic ash") is preferably formed by rapidly heating naturally-occurring particulate volcanic ash as described hereabove to a temperature between about 930° C. and about 1100° C. and then rapidly cooling the expanded particles to below about 900° C. while maintaining the environmental pressure less than atmospheric. In the heating and cooling process, the shards are softened and gas trapped in the interior of the shared body expands. The shards thus become expanded hollow spherical bodies. Generally, the gas expansion causes most of the voids inside the softened body to merge and the softened body expands forming a monocellular hollow sphere. In some instances, however, the body may actually be polycellular. For purposes of this invention, however, the actual number of cells inside the hollow body is not significant. Therefore, the expanded product, whether monocelluar or containing particles which are actually polycellular, is referred to as monocellular. When the softened hollow body is cooled, the hollow spherical sheel solidifies and the expanded gas trapped inside the cells is cooled to create a partial vacuum inside the individual spheres.

In accordance with the invention, lightweight gypsum wallboard is formed by substituting expanded monocellular volcanic ash for part of the calcined gypsum used in conventional processes for making gypsum wallboard and eliminating or reducing the amount of foaming agent or agents conventionally used. Accordingly, the hollow bodies of expanded monocellular volcanic ash are evenly distributed throughout the core of the wallboard to substantially reduce its bulk density, thereby forming a much lighter gypsum body. The expanded monocellular volcanic ash particles do not interfere with the re-hydration of the gypsum and, in fact, appear to become bonded within the gypsum crystalline structure to form a more homogenous core with finely divided enclosed glassy spheres evenly distributed throughout. Therefore the bulk weight of the wallboard is greatly reduced, but the core is much less porous. Since the expanded volcanic ash is in the form of enclosed spheres, the voids in the core are mutually isolated. Thus the core is much less fluid permeable. Furthermore, since the spheres are enclosed and have an internal pressure less than atmospheric, thermal conduction across the board is greatly reduced. Likewise, since there are no interconnecting pathways between the individual partially evacuated spheres, the core forms an effective acoustic and fluid barrier. As an added advantage, the substitution of expanded monocellular volcanic ash for part of the calcined gypsum permits the use of less excess water, thus less energy is required for drying and curing the finished wallboard.

In the preferred method of practicing the invention, expanded monocellular volcanic ash as defined hereinabove is substituted for part of the calcined gypsum powder used for forming the slurry or stucco. Since the loose bulk density of expanded monocellular volcanic ash is substantially less than the bulk density of hydrated gypsum, and since no water of hydration is needed for the volcanic ash which replaces gypsum, the weight of the final product is directly related to the volume ratio of expanded monocellular volcanic ash in the final core product and the loose bulk density of the expanded monocellular volcanic ash. For example, by substituting expanded monocellular volcanic ash having a loose bulk density of about seven pounds per cubic foot for about 31% of the volume of dry calcined gypsum in forming the slurry, the weight of the final wallboard product is reduced by about 17%. By substituting the samme material for about 41% of the volume of the dry calcined gypsum in forming the slurry, the weight of the final product is reduced about 28%. Translated into actual weight reduction in final product, the weight of one-half inch wallboard is reduced from about 1.8 pounds per square foot (45 pounds per cubic foot of core) to about 1.5 pounds per square foot (36 pounds per cubic foot of core) by using a mixture of calcined gypsum and expanded monocellular volcanic ash which is 31% by volume expanded monocellular volcanic ash having a loose bulk density of about seven pounds per cubic foot. Using expanded monocellular volcanic ash having lower loose bulk densities will, of course, lower the weight of the final product.

The loose bulk density of expanded monocellular volcanic ash may vary from less than 0.5 pounds per cubic foot to 15 pounds per cubic foot depending upon several variable factors in the bloating process. For example, since larger shards require longer residence times in the heated zone and also form larger spheres when bloated, careful control of shard size, heating temperatures and residence times in the heated zone may produce expanded monocellular volcanic ash material which has a loose bulk density less than 0.5 pounds per cubic foot. Accordingly, employing such lightweight material in the wallboard process described can produce one-half inch wallboard weighing a little as one pound per square foot (24 pounds per cubic foot of core) or less.

It should also be noted that by employing a substantial portion of expanded monocellular volcanic ash in the slurry, the water added to the slurry to hydrate the replaced calcined gypsum may be eliminated. Likewise, a proportionate part of the excess water may be eliminated, thus reducing the drying heat requirements. Since the bulk density of the finished board is reduced by the partially evacuated spheres, the foaming agent may be eliminated or substantially reduced, thus producing a board which is lighter than conventional board but much less fluid permeable. It should also be noted that since wallboard made with the expanded substantially monocellular volcanic ash exhibits acoustic, thermal and mechanical characteristics far superior to conventional gypsum wallboard, the foaming agent may be eliminated and sufficient expanded volcanic ash particles added to the slurry to compensate for the expansion caused by foaming in conventional processes. In this case the final board may not be lighter than conventional board, but will exhibit far superior acoustic, thermal and mechanical characteristics.

Since the loose bulk density of expanded substantially monocellular volcanic ash may vary from less than 0.5 pounds per cubic foot to about 15 pounds per cubic foot, the precise volume ratio of calcined gypsum to volcanic ash required to produce a gypsum product of predetermined bulk density can only be determined after the loose bulk density and average particle size of the spherical particles have been determined. Furthermore, if a foaming agent is used in the process, the expansion of the slurry caused by foaming must also be considered. These variables, however, may readily be determined by those skilled in the art to produce a gypsum product in accordance with the invention having a bulk density from less than about 24 pounds per cubic foot to about 45 pounds per cubic foot. Furthermore, the ratio of calcined gypsum to expanded particles can be adjusted as desired and used with or without a foaming agent to produce a gypsum product having the desired acoustic, thermal and mechanical properties within acceptable bulk density ranges.

It will be readily apparent that conventional processes for foaming re-hydrated calcium sulfate, with or without employing foaming agents or addition of fibers, may be modified in accordance with the teachings of this invention to produce monolithic bodies of hydrated calcium sulfate in which as little as five percent or less to as much as fifty percent or more of the volume of the monolithic body is substantially spherical bodies of expanded monocellular volcanic ash particles evenly distributed throughout the hydrated calcium sulfate body.

While the invention has been described with particular reference to producing modified gypsum wallboard utilizing various specific loose bulk densities of expanded volcanic ash material, the invention is not to be construed as so limited. The principles thereof are equally applicable to other forms of products utilizing a body of re-hydrated calcium sulfate. It is to be understood, therefore, that although the invention has been described with particular reference to specific embodiments thereof, the forms of the invention shown and described in detail are to be taken as preferred embodiments thereof, and that various changes and modifications may be resorted to without departing from the spirit and scope of the invention as defined by the appended claims.

What is claimed:

1. A gypsum product including a body consisting essentially of hydrated calcium sulfate and expanded substantially monocellular volcanic ash particles in the form of hollow spherical bodies distributed throughout the hydrated calcium sulfate, said body having a bulk density of from about 24 pounds per cubic foot to about 45 pounds per cubic foot.

2. A gypsum product as defined in claim 1 wherein the loose bulk density of said expanded substantially monocellular volcanic ash particles is between about 0.5 pounds per cubic foot and about 15 pounds per cubic foot.

3. A gypsum product as defined in claim 1 wherein said expanded substantially monocellular volcanic ash particles comprise from about five percent to about fifty percent of the volume of said body.

4. A wallboard comprising parallel sheets of paper bonded to opposite major faces of a monolithic core, wherein said core consists essentially of hydrated calcium sulfate and expanded substantially monocellular volcanic ash and has a bulk density of from about 24 pounds per cubic foot to about 45 pounds per cubic foot.

5. A wallboard as defined in claim 4 wherein the loose bulk density of said expanded substantially monocellular volcanic ash is between about 0.5 pounds per cubic foot and about 15 pounds per cubic foot.

6. A wallboard as defined in claim 4 wherein said expanded substantially monocellular volcanic ash comprises from about five percent to about fifty percent of the volume of said core.

7. In the process of forming wallboard wherein calcined calcium sulfate is mixed with water and additives and formed into a slurry which is then formed into a core between parallel sheets of paper and cured to form a monolithic core of hydrated calcium sulfate, the step of adding expanded substantially monocellular volcanic ash comprising substantially spherical enclosed hollow bodies having an internal gas pressure less than atmospheric to said calcined calcium sulfate.

8. The process defined in claim 7 wherein said expanded substantially monocellular volcanic ash is added in amounts sufficient to constitute from about five percent to about fifty percent by volume of said slurry.

9. The process defined in claim 7 wherein said expanded substantially monocellular volcanic ash has a loose bulk density of from about 0.5 pounds per cubic foot to about 15 pounds per cubic foot prior to mixing with said calcined calcium sulfate.

* * * * *

UNITED STATES PATENT OFFICE
CERTIFICATE OF CORRECTION

Patent No. 4,238,546  Dated December 9, 1980

Inventor(s) Harold L. Phillips

It is certified that error appears in the above-identified patent and that said Letters Patent are hereby corrected as shown below:

In Column 1, line 59, "affected" should read ---affecting---

In Column 2, line 47, "shared" should read ---shard---

In Column 2, line 58, "sheel" should read ---shell---

In Column 3, line 40, "samme" should read ---same---

In Column 3, line 66, "a" should read ---as---

In Column 4, line 43, "foaming" should read ---forming---

Signed and Sealed this

Fourteenth Day of April 1981

[SEAL]

Attest:

RENE D. TEGTMEYER

Attesting Officer  Acting Commissioner of Patents and Trademarks